United States Patent
Fontana et al.

(10) Patent No.: US 10,606,145 B2
(45) Date of Patent: Mar. 31, 2020

(54) PLASMONIC NANOPARTICLES AS PIXELS AND SUB-MICROSECOND SWITCHES

(71) Applicant: The Government of the United States of America, as represented by the Secretary of the Navy, Arlington, VA (US)

(72) Inventors: Jake Fontana, Alexandria, VA (US); Nicholas J. Greybush, Alexandria, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/163,399

(22) Filed: Oct. 17, 2018

(65) Prior Publication Data

US 2019/0113824 A1 Apr. 18, 2019

Related U.S. Application Data

(60) Provisional application No. 62/573,718, filed on Oct. 18, 2017.

(51) Int. Cl.
| | |
|---|---|
| *G02B 26/00* | (2006.01) |
| *G02F 1/29* | (2006.01) |
| *G02F 1/19* | (2019.01) |
| *H01S 3/067* | (2006.01) |
| *G02F 1/01* | (2006.01) |

(Continued)

(52) U.S. Cl.
CPC ............ *G02F 1/292* (2013.01); *G02F 1/0063* (2013.01); *G02F 1/0115* (2013.01); *G02F 1/0118* (2013.01); *G02F 1/172* (2013.01); *G02F 1/195* (2013.01); *H01S 3/067* (2013.01); *G02F 2201/02* (2013.01); *G02F 2201/08* (2013.01); *G02F 2201/122* (2013.01); *G02F 2202/16* (2013.01); *G02F 2202/36* (2013.01); *G02F 2203/10* (2013.01)

(58) Field of Classification Search
USPC ......................................................... 385/40
See application file for complete search history.

(56) References Cited

U.S. PATENT DOCUMENTS

| | | | | |
|---|---|---|---|---|
| 10,243,660 B2* | 3/2019 | Chang | .................... | H04B 10/50 |
| 2011/0074808 A1* | 3/2011 | Huang | .................... | G09G 5/02 |
| | | | | 345/590 |

(Continued)

FOREIGN PATENT DOCUMENTS

WO 2016-046815 A1 3/2016

OTHER PUBLICATIONS

J. Fontana, G. K. B. Da Costa, J. M. Pereira, J. Naciri, B. R. Ratna, P. Palffy-Muhoray, and I. C. S. Carvalho, "Electric field induced orientational order of gold nanorods in dilute organic suspensions," Appl. Phys. Lett. 108, 1-5 (2016).

(Continued)

*Primary Examiner* — Eric Wong
(74) *Attorney, Agent, or Firm* — US Naval Research Laboratory; Roy Roberts (57) ABSTRACT

Application of an electric field to nanorods can control their alignment, thus providing techniques for ultra-fast switching and optical modulators, for example those that might serve as display indicators.

14 Claims, 11 Drawing Sheets

(51) Int. Cl.
*G02F 1/00* (2006.01)
*G02F 1/17* (2019.01)

(56) References Cited

U.S. PATENT DOCUMENTS

| | | | | |
|---|---|---|---|---|
| 2011/0109659 | A1* | 5/2011 | Tang | G02F 1/1334 345/690 |
| 2011/0109956 | A1* | 5/2011 | Hashimura | G02F 1/19 359/290 |
| 2011/0299001 | A1* | 12/2011 | Banin | B82Y 20/00 349/33 |
| 2013/0201544 | A1 | 8/2013 | Lezec et al. | |
| 2015/0212316 | A1* | 7/2015 | Krishnan | G02B 26/026 359/296 |
| 2015/0346522 | A1* | 12/2015 | Hilarius | G02F 1/0316 359/259 |
| 2016/0133424 | A1* | 5/2016 | Chou | H01J 1/3042 257/11 |
| 2017/0222724 | A1* | 8/2017 | Chang | H04B 10/50 |

OTHER PUBLICATIONS

S. Etcheverry, L. F. Araujo, G. K. B. da Costa, J. M. B. Pereira, A. R. Camara, J. Naciri, B. R. Ratna, I. Hernández-Romano, C. J. S. de Matos, I. C. S. Carvalho, W. Margulis, and J. Fontana, "Microsecond switching of plasmonic nanorods in an all-fiber optofluidic component," Optica 4, 864 (2017).

S. Etcheverry, L. F. Araujo, I. C. S. Carvalho, W. Margulis, and J. Fontana, "Digital electric field induced switching of plasmonic nanorods using an electro-optic fluid fiber," Appl. Phys. Lett. 111, 221108 (2017).

A. Smith and J. Guild, "The C.I.E. Colourimetric Standards and their Use," Trans. Opt. Soc. 33, 73-134 (1931).

E. Monteiro and S. Hranilovic, "Design and Implementation of Color-Shift Keying for Visible Light Communications," J. Light. Technol., 32, 2053-2060 (2014).

International Search Report and Opinion dated Feb. 13, 2019 in PCT/US2018/0S6362.

Etcheverry et al., Optica, vol. 4, No. 8, Aug. 2017, pp. 864-870.

* cited by examiner

PLASMONIC NANOPARTICLES AS PIXELS AND SUB-MICROSECOND SWITCHES

CROSS-REFERENCE TO RELATED APPLICATIONS

This Application claims the benefit of U.S. Provisional Application 62/573,718 filed on Oct. 18, 2017, the entirety of which is incorporated herein by reference.

BACKGROUND

Light incident on subwavelength metallic structures can set up collective oscillations of the materials' conduction electrons, termed localized surface plasmon resonances. The attributes of such resonances depend on a number of factors, including the material, size, shape, and orientation of the plasmonic structure. The strong interaction and localization of light in plasmonic structures make them attractive candidates for controlling the properties of light, including intensity, phase, polarization, direction, and spectral power distribution. In the visible spectrum, these effects can be employed for the generation and modification of color (see ref. 1). However, a large portion of prior demonstrations of plasmonic structures have shown properties that are static in time, limiting their application for real-time light modulation. Therefore, a need exists for mechanisms by which plasmonic structures can modulate light in a dynamic and controllable manner, and preferably with a fast switching time.

Application of an external electric field offers a potential means to modulate the optical properties of matter, including by imparting alignment to anisotropic materials. In general, the permanent or induced dipole moment and resulting polarizability of a molecule is too small to couple to external electric fields to overcome disordering thermal forces, preventing alignment. If anisotropic molecules are condensed into a liquid crystal phase, then the additional van der Waal forces from the near-neighbor interactions increase the polarizability to enable alignment of the molecules and control the optical properties. The electric-field-induced alignment of anisotropic molecules in liquid crystal phases has enabled disruptive technologies such as smart phones and flat screen displays.

The switching time of these materials depends on the sum of their on- and off-times. The on-time needed to align the molecules into the direction of the applied electric field is predominately set by the magnitude of the field applied, $\tau_{on} \approx \gamma/\varepsilon E^2$, where $\gamma$ is the viscosity, $\varepsilon$ is the dielectric permittivity and E is the electric field. The off-time is related to the thermal rotational diffusion of the liquid crystal molecules and typically is the limiting factor to determine the overall switching time. In the case of liquid crystals, the near-neighbor interactions create strong electrohydrodynamic coupling, leading to a slow characteristic off-time, $\tau_{off} \approx \gamma d^2/K \approx ms$, where d is the cell thickness and K is the elastic constant of the liquid crystal. This well-known limitation has constrained potential electro-optic applications for decades.

A need exists for improved switching times.

BRIEF SUMMARY

Described herein is the modulation of light by the alignment of plasmonic nanorods within an electric field. The optical anisotropy of plasmonic nanorods is employed to impart changes in the global optical response of suspensions of nanorods in unaligned versus various aligned states. Discrete volumes of plasmonic nanorod suspensions under the control of applied electric fields constitute plasmonic pixels that are used individually and/or in collection to dynamically modulate the properties of light. A notable example is in controlling the chromaticity and/or luminance of the perceived color of the pixels. The microsecond switching times of the pixels present advantages over conventional liquid-crystal-based optical devices.

Also described herein is the digital electric-field-induced switching of plasmonic nanorods between "1" and "0" orthogonal aligned states using an electro-optic fluid fiber component. Digitally switching the nanorods circumvents their thermal rotational diffusion, demonstrating an approach to achieve submicrosecond switching times. From an initial unaligned state, the nanorods can be aligned into the applied electric field direction in 110 nanoseconds. The high-speed digital switching of plasmonic nanorods integrated into an all-fiber optical component may provide novel opportunities for remote sensing and signaling applications.

In one embodiment, an optical modulator includes at least one pixel comprising a plurality of nanorods and configured to receive illumination from an illumination source; and electrodes configured to apply an electric field to the nanorods sufficient to alter their orientation and thereby modulate at least one optical property of the illumination reaching the nanorods.

In a further embodiment, an electro-optical fluid fiber component includes an inlet and an outlet configured to receive and send light, respectively; a plurality of nanorods contained between the inlet and outlet; and electrodes configured to apply an electric field to the nanorods and thereby modulate passage of the light through the fiber component, wherein the component is operable at switching speeds of one millisecond or less.

In another embodiment, a method of modulating light includes transmitting light through an electro-optical fluid fiber component comprising a plurality of nanorods and electrodes configured to apply a voltage to the nanorods, wherein the light passes through the plurality of nanorods; passing an electric field across the electrodes, thereby modulating the light as it passes through the nanorods.

DETAILED DESCRIPTION

Definitions

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used herein, the singular forms "a", "an," and "the" do not preclude plural referents, unless the context clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

As used herein, the term "nanorod" refers to an oblong nanoscale object having one or more dimensions of less than or equal to 100 nanometers and an aspect ratio of length to diameter in the range of about 1.5 to about 50. Nanorods may have various shapes including spherocylinders, ellipsoids, and the like, and may be asymmetric.

As used herein, unless the context clearly dictates otherwise, the term "light" includes both visible light and light beyond the visible spectrum.

As used herein, the term "optical modulator" refers to something that changes the properties of light passing through and/or reflecting therefrom.

DESCRIPTION

Dynamic Plasmonic Pixels as Optical Modulators

Figure 1:
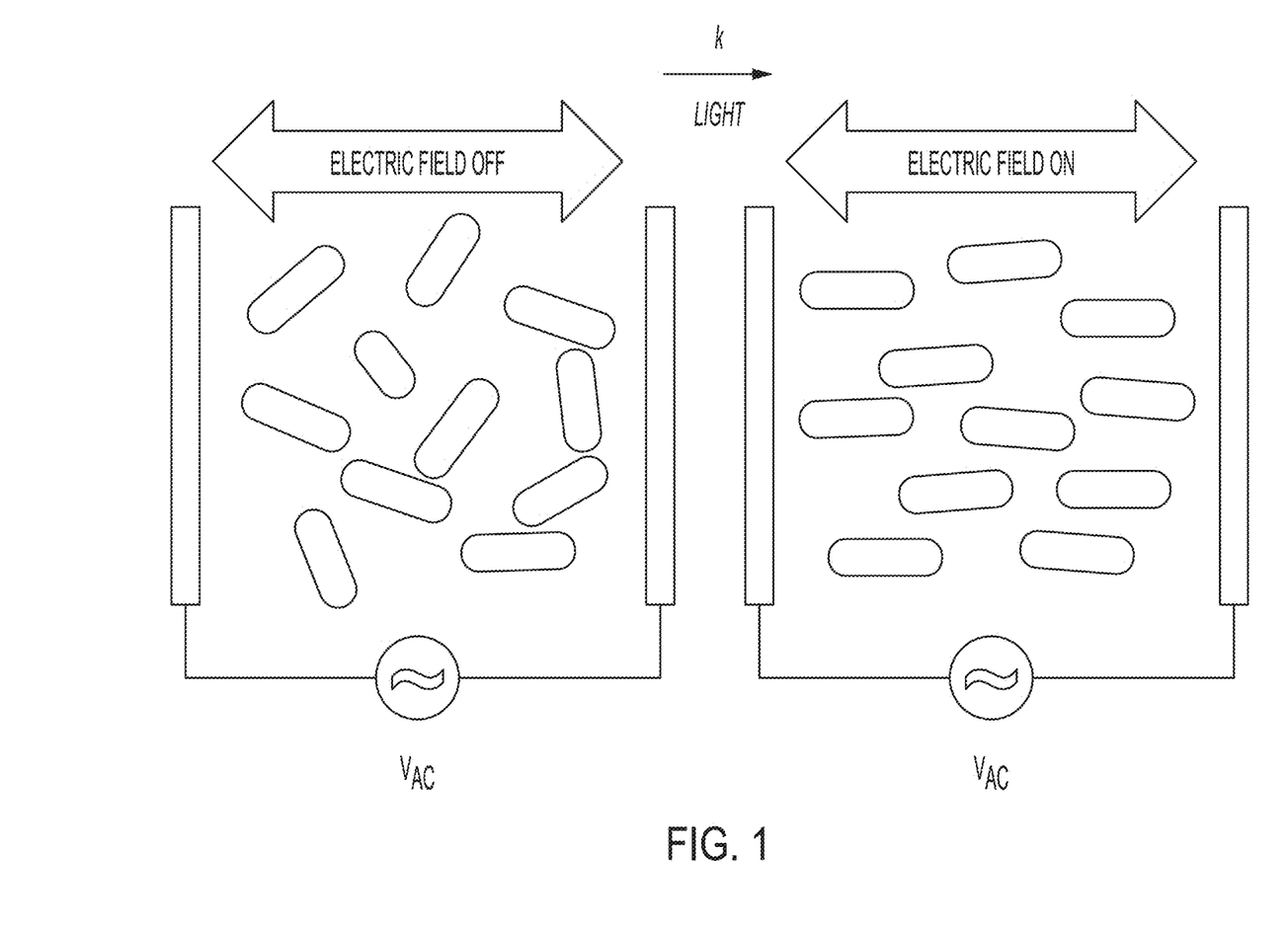
FIG. 1 is a schematic depiction of nanorod alignment within a liquid cell by application of an alternating current (AC) voltage that generates an applied electric field. The nanorods align with their long axes parallel to the applied field. The vector k represents the direction of light propagation.
Figure 2:
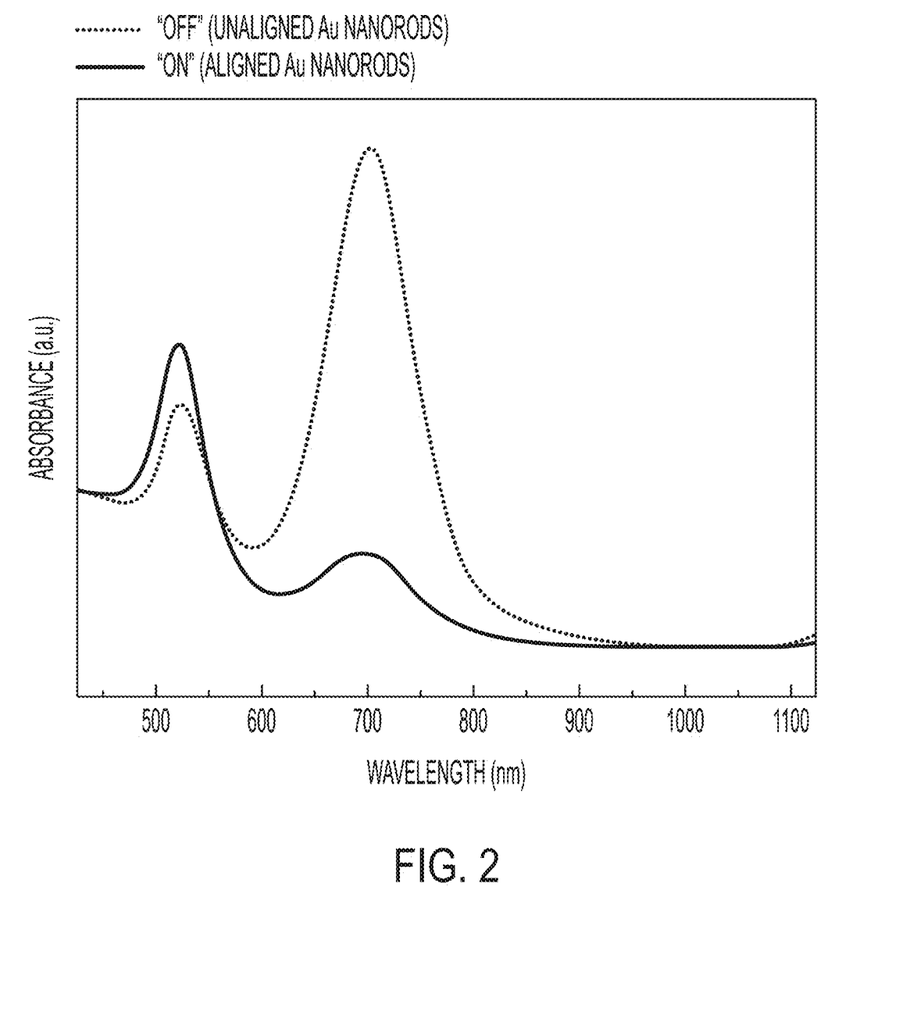
FIG. 2 illustrates measured absorption spectra of nanorods in a pixel when the applied electric field is off (and the nanorods are unaligned) and when the electric field is on (and the nanorods are aligned).
Figure 3A:
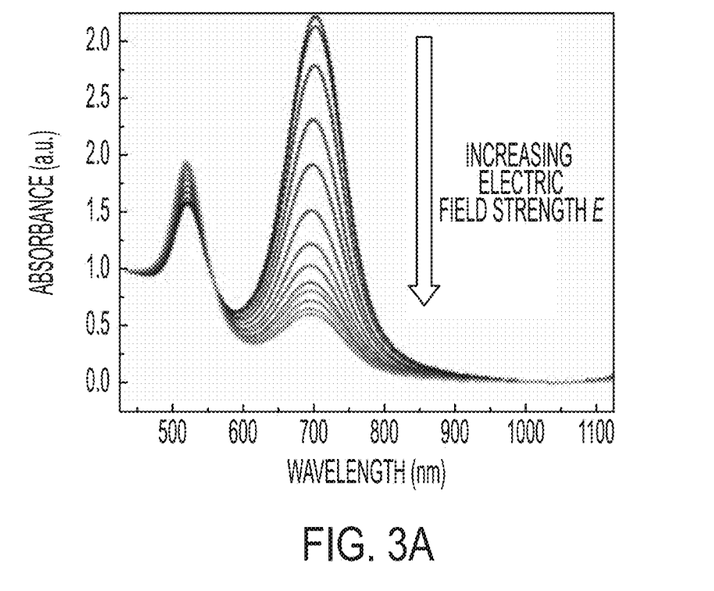
FIG. 3A shows the measured absorption spectrum of nanorods at varying strengths of applied electric field E. Increasing E results in greater suppression of the longitudinal surface plasmon resonance.
Figure 3B:
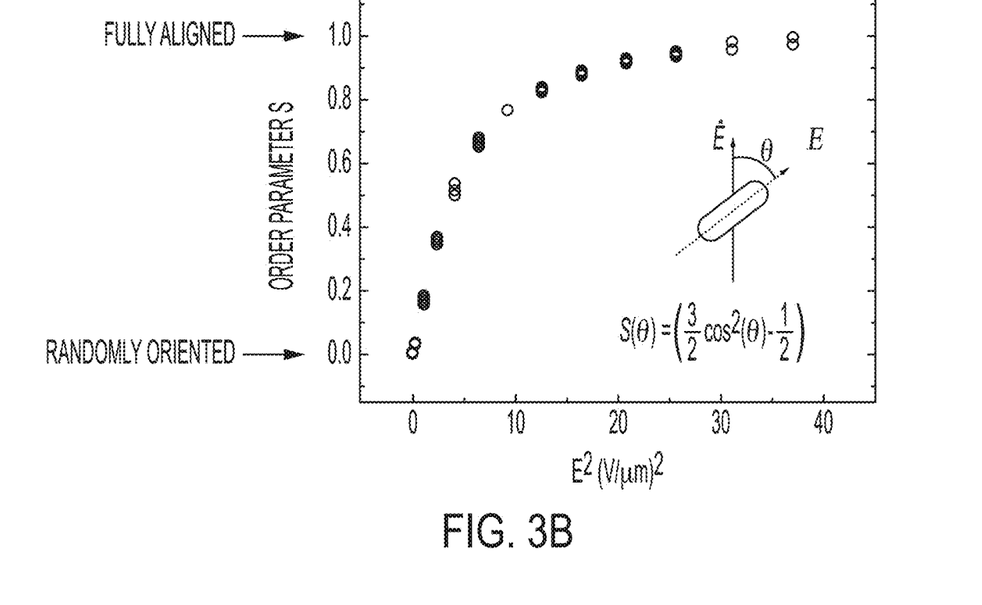
FIG. 3B shows the value of scalar order parameter S as a function of the square of the applied electric field strength. A value of zero represents random nanorod orientation, and a value of one represents complete alignment.

Suspensions of colloidal Au nanorods are dispensed within a thin liquid cell between two transparent conducting electrodes (FIG. 1). The nanorods are initially randomly oriented due to Brownian motion, and their optical absorption spectrum exhibits distinct longitudinal and transverse localized surface plasmon resonances associated respectively with collective electron oscillations along the long and short axes of the nanorods (FIG. 2). Application of an alternating current (AC) electric field across the cell aligns the nanorods to have their longitudinal axes parallel to the applied field (see ref. [2]), (FIG. 1, right). When the nanorod suspension is illuminated by light with k-vector along this direction, the longitudinal resonance is suppressed, as there is now no component of incident optical electric field in the longitudinal direction. FIG. 2 illustrates the resulting modulation of the absorption spectrum between the unaligned and aligned states. In this particular example, absorption associated with the longitudinal surface plasmon resonance at ~700 nm diminishes upon alignment, and absorption associated with the transverse surface plasmon resonance at ~520 nm increases upon alignment. The degree of alignment is controlled by varying the strength of the applied electric field. The absorption spectrum can therefore be continuously varied between that of the unaligned state and that of the fully aligned state (FIG. 3, top). The degree of nanorod alignment can be characterized using a scalar order parameter:

$$S(\theta) = \left\langle \frac{3}{2}\cos^2\theta - \frac{1}{2} \right\rangle$$

where θ is the angle between the nanorod long axis and the orientation of the applied electric field and the braces denote the ensemble average. FIG. 3, bottom illustrates that the average nanorod orientation can be varied between random orientation (S=0) and complete alignment parallel to the applied electric field (S=1).

Figure 4:
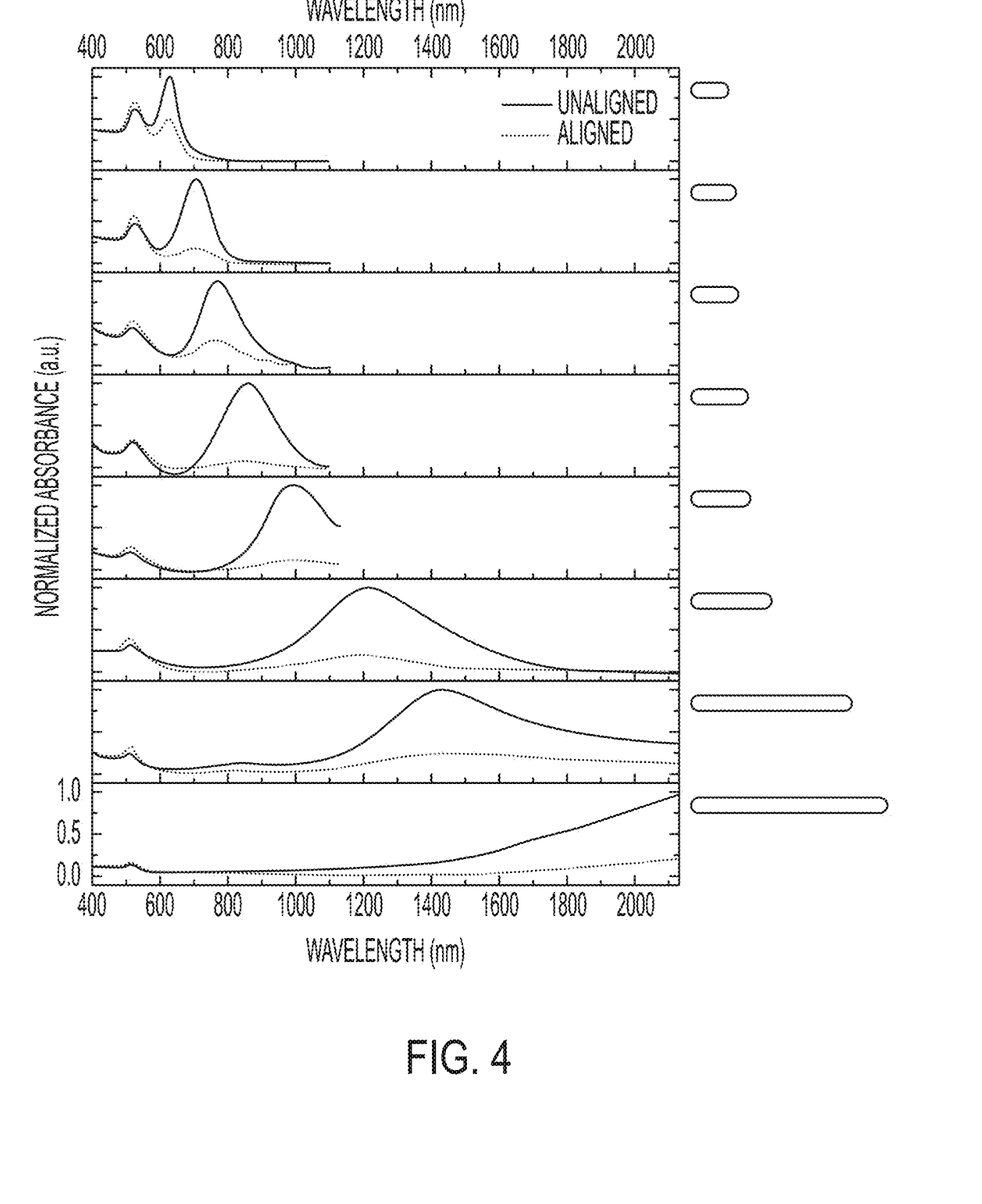
FIG. 4 provides measured absorption spectra of unaligned and aligned suspensions of nanorods with varying aspect ratio (and therefore varying wavelength of surface plasmon resonance). The drawings depict nanorods having the aspect ratio determined from imaging the experimentally used nanorods.
Figure 5:
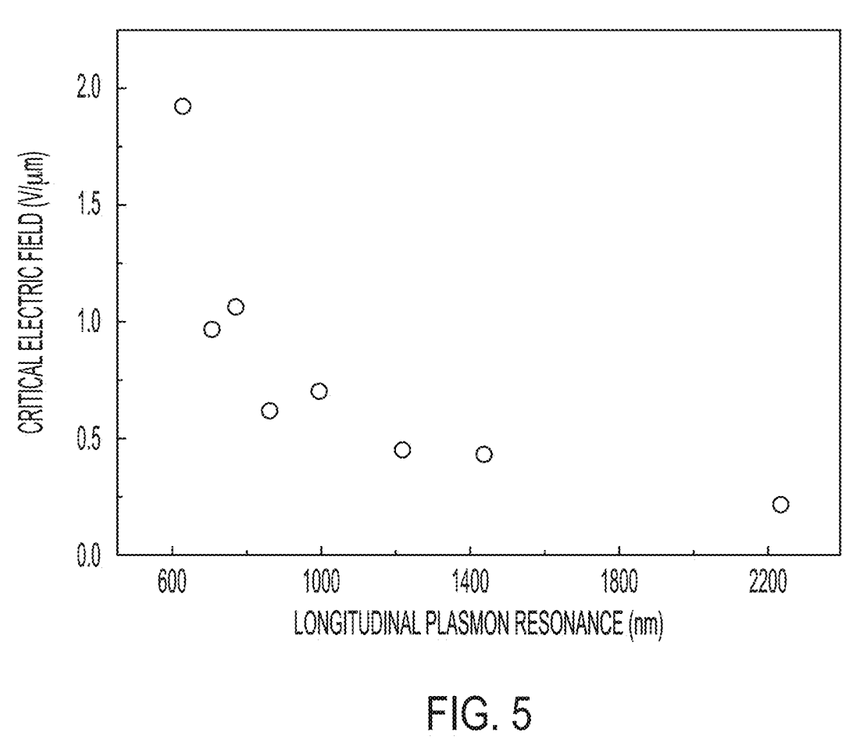
FIG. 5 illustrates critical electric field needed to induce nanorod alignment as a function of the wavelength of the longitudinal surface plasmon resonance. Larger wavelengths correspond to longer nanorods.

The wavelength at which the plasmon resonances occur can be adjusted through various methods, including by tailoring the nanorod aspect ratio. FIG. 4 illustrates that increasing the nanorod aspect ratio increases the wavelength of the longitudinal surface plasmon resonance, shown here at various positions in the visible, near-infrared, and infrared spectral bands. In each case, the spectra exhibit the characteristic behavior upon alignment that is described above. The critical electric field needed to overcome rotational diffusion and induce alignment diminishes as the nanorod aspect ratio is increased (FIG. 5), with approximate magnitudes of 0.2-2 V/μm under the exemplary conditions described here.

Figure 6A:
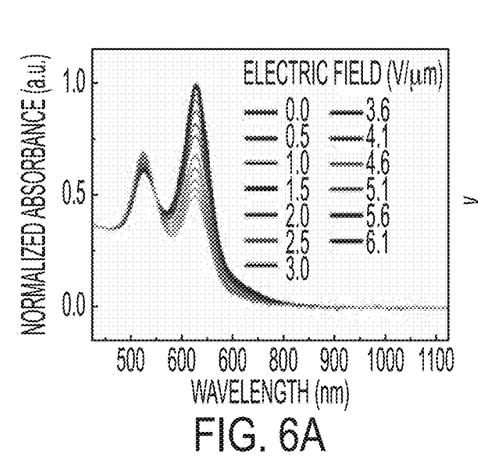
FIGS. 6A-6F show (a) absorption spectrum, (b) chromaticity diagram, and (c) luminance as a function of applied electric field for nanorods having a longitudinal surface plasmon resonance around 625 nm; (d) absorption spectrum, (e) chromaticity diagram, and (f) luminance as a function of applied electric field for nanorods having a longitudinal surface plasmon resonance around 705 nm, respectively.
Figure 6B:
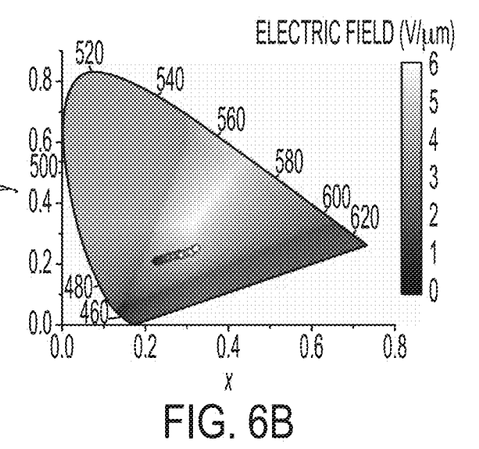
Figure 6C:
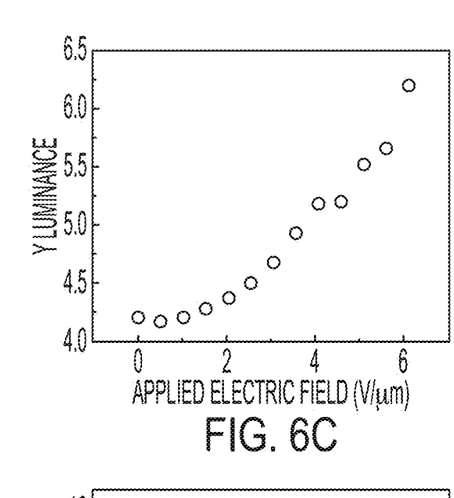
Figure 6D:
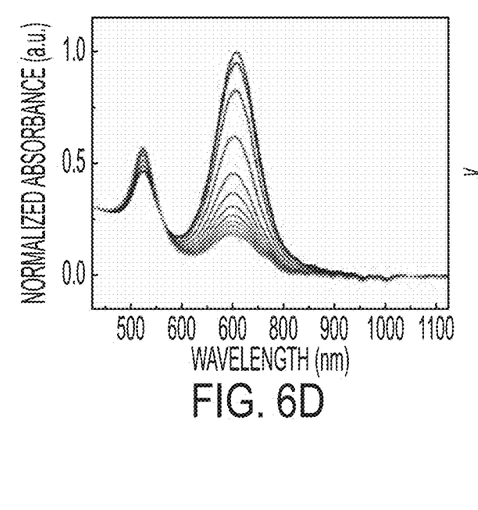
Figure 6E:
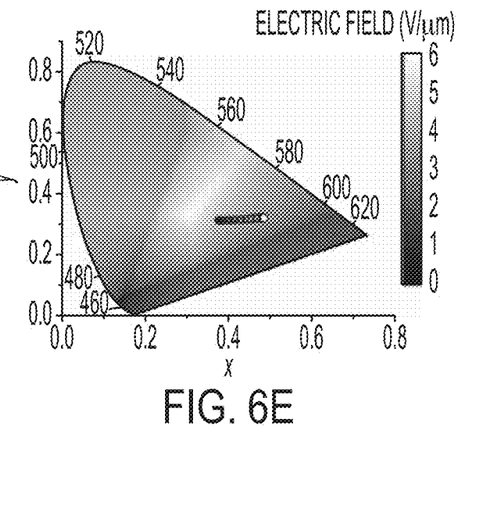
Figure 6F:
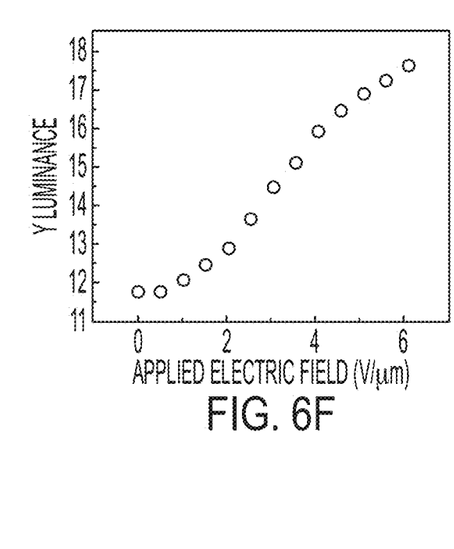

For plasmon resonances in the visible spectrum, the modulation of the absorption spectrum upon nanorod alignment is manifested as a perceptible change in color and/or brightness when the nanorod suspensions are observed under illumination (for example in transmission with backlit illumination). The color modulation achieved through nanorod alignment is quantified by mapping the absorption spectra to CIE 1931 x,y chromaticity coordinates (see ref. [3]). As an example for one particular nanorod type whose absorption spectrum is shown in FIG. 6A, the chromaticity shifts from a position in the blue region of the chromaticity diagram toward increasingly red chromaticity upon increasing degree of alignment (FIG. 6B). The change in chromaticity is accompanied by an increase in luminance (FIG. 6C) as more light is transmitted. A second example where the nanorod aspect ratio is slightly larger is presented in FIGS. 6D to 6F, where the chromaticity shifts from a position near the white-point toward increasingly red chromaticity upon alignment.

Figure 7A:
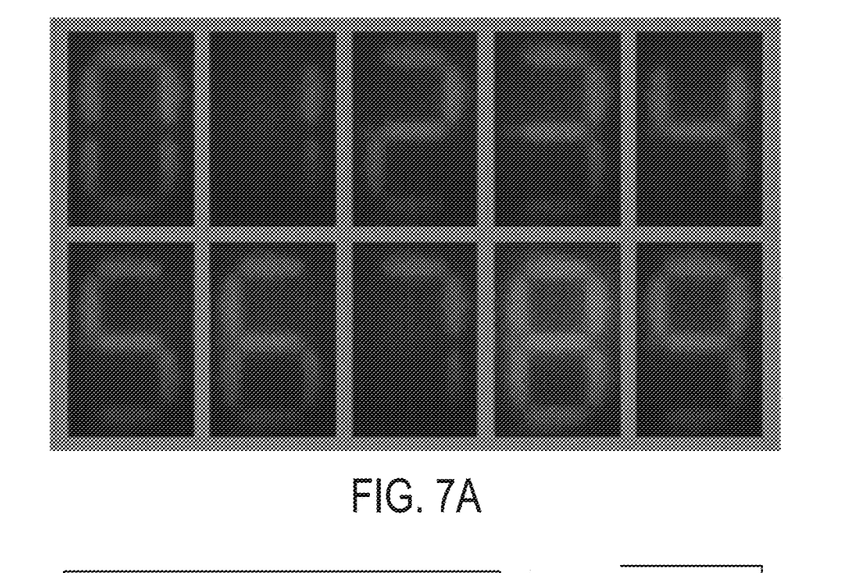
FIGS. 7A and 7B provide photographic and schematic depictions, respectively, of a 7-segment numerical indicator fabricated by patterning a transparent conducting oxide into individually electrically-addressable segments.
Figure 7B:
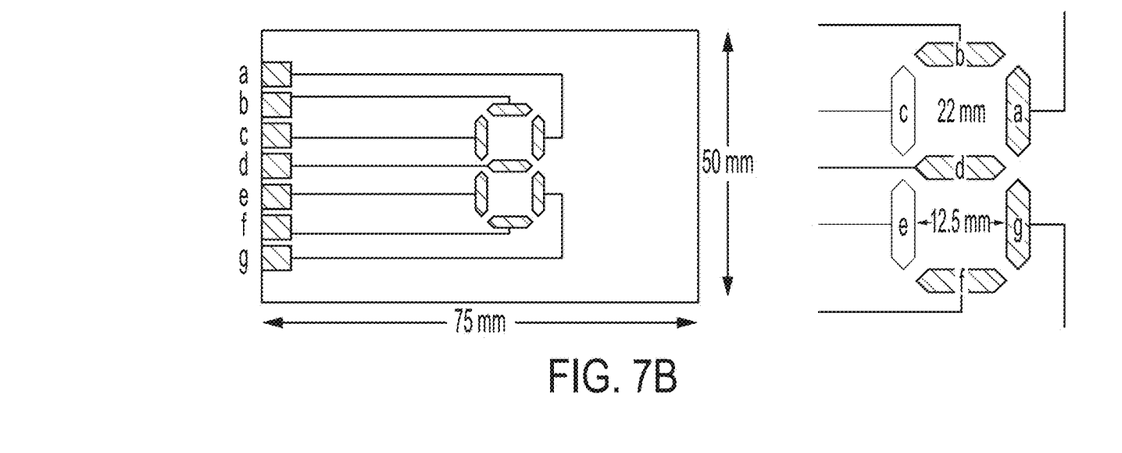

The chromaticity and/or luminance contrast between the "off" and "on" states can be exploited for display applications. To demonstrate, FIG. 7 presents photographs of a 7-segment numerical indicator fabricated by patterning transparent conducting electrodes and dynamically addressing each segment to switch the numerals. The nanorods are dispensed between two transparent conducting electrodes, one of which is patterned in the manner shown in FIG. 7, bottom. Within the volume between the conductive backplane and the conductive segments to which a voltage is applied, the nanorods align, increasing the transmittance. When backlit with a light source, these regions appear to have a different color and/or brightness compared to regions in which the nanorods are not aligned.

Microsecond switching times for Au nanorod alignment (three orders of magnitude faster than switching in traditional liquid crystal materials) have been demonstrated as noted below (see also refs. [4,5]), emphasizing the favorability of plasmonic nanorods for optical applications with high performance demands. Utilizing the spectral, spatial, and temporal control of plasmonically generated color as demonstrated herein provides a platform for engineering next-generation optical technologies. An optical modulator operating according to these principles might be used in any number of applications including a display device, portable electronic devices, etc.

Sub-Microsecond Electro-Optic Fluid Fiber Switches Using Electric-Field-Aligned Plasmonic Nanoparticles A recent approach towards switching liquid crystal molecules avoided re-alignment of the molecules altogether by rapidly electrically inducing a change in the refractive index of the molecules in a liquid crystal phase. The response time of this system was 10's of nanoseconds, yet the change in the optical properties was small and cannot be maintained for long times before the usual electric-field-induced alignment of the molecules occurs. The electric-field-induced alignment of plasmonic nanorods is a novel paradigm to anisotropic molecules in liquid crystal phases. A key advantage of plasmonic nanorods is that the polarizability of a single nanorod in a dilute suspension is adequately large to couple to an external electric field, enabling alignment and the ability to tune the optical properties at visible and near-infrared wavelengths. A significant consequence of this electro-optic mechanism is that the off-time decreases by 1,000-fold ($\gamma L^3/k_b T \approx \mu s$, where L is the length of the nanorod, $k_b$ is the Boltzmann constant and T is the temperature) compared to liquid crystals, due to the absence of near-neighbor interactions. The electric-field-induced alignment of plasmonic nanorods alleviates the long-standing switching time limitation of liquid crystal based devices, potentially ushering in innovative display, filter, and spatial light modulator technologies. The switching time for the plasmonic nanorods is limited to the order of microseconds, due to the thermal rotational diffusion of the nanorods when the field is switched off. To break through this limit, consider that the on-time for the nanorods can become arbitrarily small if the applied electric field is large. Therefore, if the nanorods are digitally switched between two orthogonal fields, holding the nanorods in a continuous "1" or "0" aligned state, then thermal relaxation can be circumvented, potentially leading to submicrosecond switching times. Aspects of this technique have been described in references 4 and 5, incorporated herein by reference for the purposes of disclosing techniques for switching nanorods.

Figure 8A:
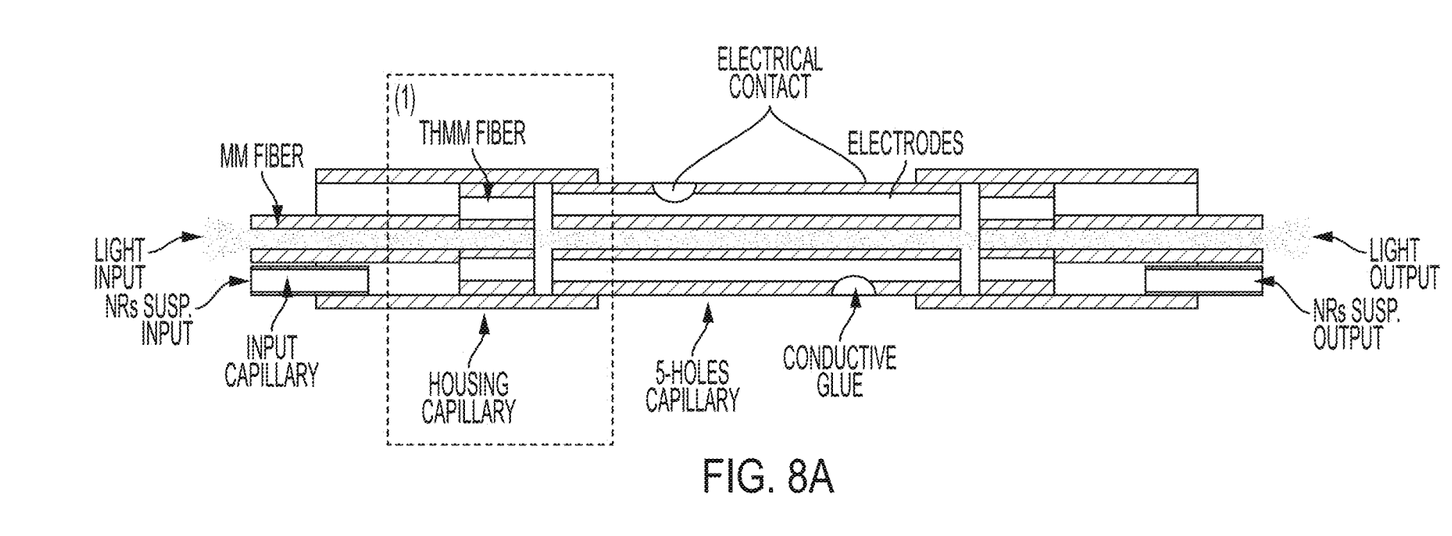
FIG. 8A is a schematic of a fiber component.
Figure 8B:
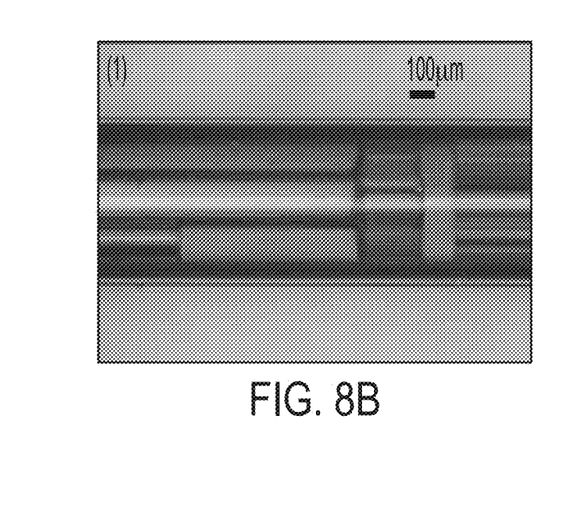
FIG. 8B is a microscope image of the part (1) of the fiber component.

To accomplish this, gold nanorods (length/diameter=75/25 nm) were synthesized using a wet seed-mediated method, coated with ligands (thiol terminated polystyrene, $M_n$=5,000 (Polymer Source, Inc.)) and suspended in toluene (~$10^{-4}$ v/v %). The suspensions were placed into an electro-optic fluid fiber component, FIG. 8A. Light was coupled from the left along a 62.5/125 μm (inner/outer diameter) multimode fiber (MM fiber) spliced to a 62.5/250 μm fiber which has two 50 μm holes along its cladding (twin-hole multimode fiber or THMM, FIG. 8A). The splice was fitted into a 250/330 μm capillary (housing capillary). A 90/125 μm capillary (input capillary), tapered to ~50/70 μm, incorporates the nanorod suspension into the component via the housing capillary. The MM fiber, input capillary, and housing capillary were sealed together with UV-curing glue. The suspensions may be composed of other metallic, semiconductor, or insulating materials, and different anisometric shapes and combinations or pluralities thereof. The dimension of the inclusions in the suspensions are preferably subwavelength.

Figure 8C:
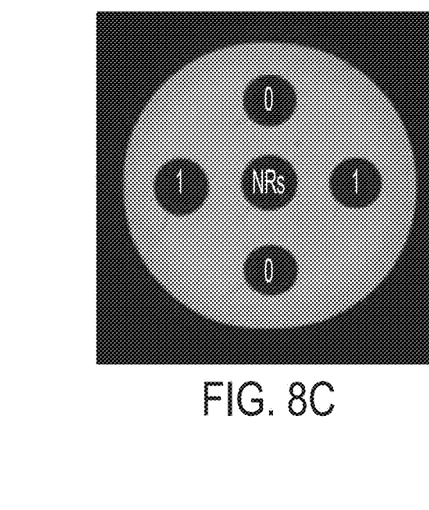
FIG. 8C is a microscope image of the 5-hole fiber.

The active fiber section includes a fiber with five holes, FIG. 8C, having the 4 outer 50-μm-diameter holes filled with BiSn alloy, and is placed on the right side of the housing capillary. The geometry of the switching element can be expanded beyond fibers, such as flat, curved or re-configurable surfaces. The electrode materials can also be varied in shape and materials, such as metals to semiconductors.

The BiSn-filled holes serve as orthogonal digital pairs of electrodes (channel 0 and channel 1). The electrical contacts for the electrodes are made by side-polishing the 5-hole fiber and gluing a copper wire to each electrode with silver-based conductive glue. A small gap (~65 μm) from the THMM fiber end allows the pressurized (~$10^5$ Pa) nanorod suspension to flow from the input capillary and into the central hole of the 5-hole fiber, where the nanorods interact with the applied electric fields. The construction of the electro-optic fluid fiber component is symmetric after the 5-hole fiber, allowing the nanorod suspension and transmitted light to be separated and collected. The time-averaged spectral evolution of the nanorods as a function of applied electric field was measured by coupling linearly polarized white light (halogen lamp) into the component. The output light from the component was coupled into a spectrometer (OceanOptics QE65000). In order to have stable alignment, the electric field is an alternating field at 200 kHz and typically 2 kV. The AC field prevents translation of the nanorods towards the electrodes and attachment to the inner walls. There were small deviations of the distances between the electrodes for each channel due to fluctuation in the manufacturing process. If a potential of 2 kV was applied to each channel, then the electric field in the fiber core was calculated using COMSOL Mulitphysics 5.2 to be 14.8 V/μm for channel 0 and 13.5 V/μm for channel 1.

Figure 9A:
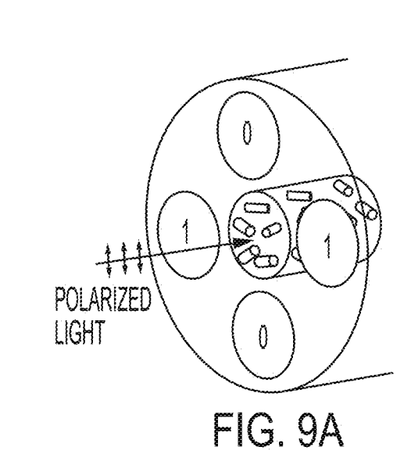
FIGS. 9A-9D demonstrate the nanorods can be aligned in the fiber component parallel (0), FIG. 9B, and perpendicular (1), FIG. 9C, to the probe light polarization. When channel 0 is switched on, FIG. 9D "0" curve, applying an AC signal, the nanorods align parallel to the field. The probe light is polarized parallel to the applied electric field (channel 0); therefore, the transmittance decreases at 740 nm due to the increased absorption from the long axis of the aligned nanorods. Conversely, the transmittance increases at 530 nm from the decreased absorption from the short axis of the nanorods. If channel 0 is turned off and channel 1 is switched on, FIG. 9D "1" curve, then the transmittance increases at 740 nm and decreases at 530 nm due to the polarization of the probe light being perpendicular to channel 1.
Figure 9B:
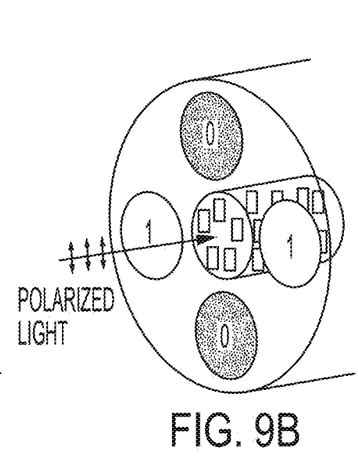
Figure 9C:
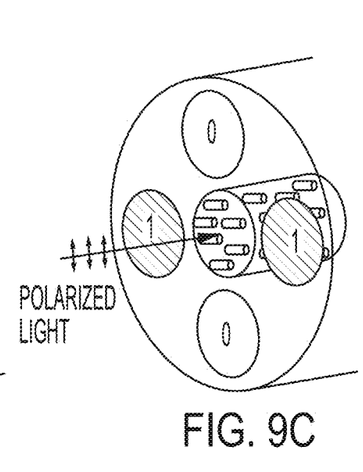
Figure 9D:
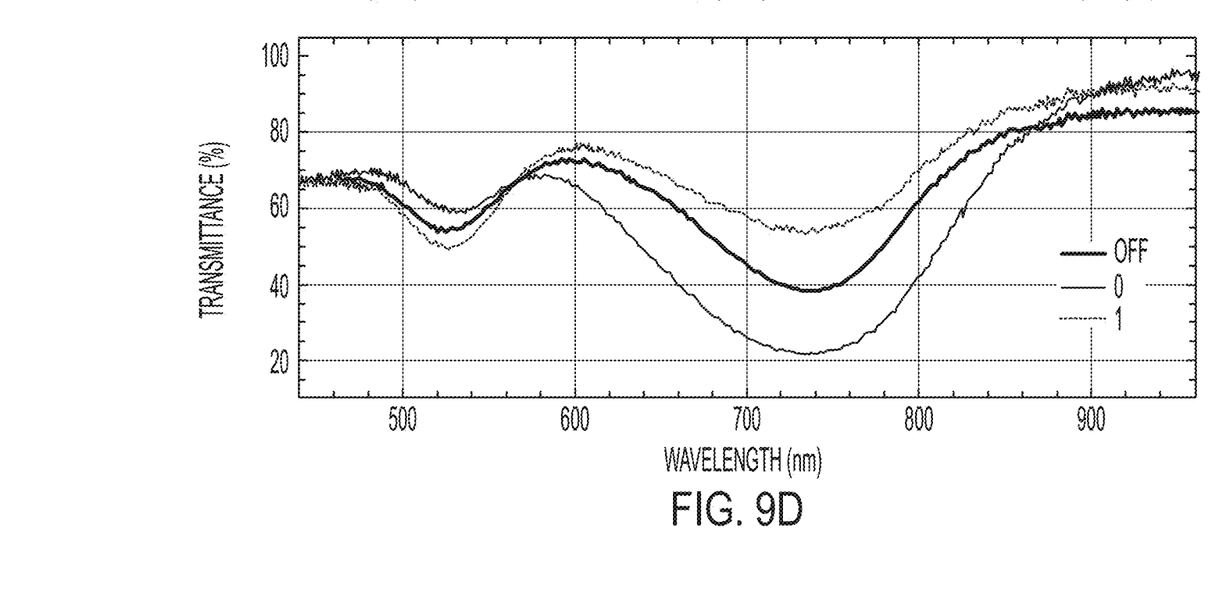

Without an electric field applied to either channel, FIG. 9A, the distribution of nanorods inside the central core of the 5-hole fiber is random, with the transmittance shown in FIG. 9D, "off" curve. The randomly distributed nanorods have two absorption peaks leading to a decrease in the transmittance, one occurring at 740 nm from the long axis of the nanorod and the other at 530 nm corresponding to the short axis.

FIGS. 9A-9D demonstrate that the nanorods can be aligned in the fiber component parallel (0), FIG. 9B, and perpendicular (1), FIG. 9C, to the probe light polarization. When channel 0 is switched on, FIG. 9D "0" curve, applying an AC signal, the nanorods align parallel to the field. The probe light is polarized parallel to the applied electric field (channel 0); therefore, the transmittance decreases at 740 nm due to the increased absorption from the long axis of the aligned nanorods. Conversely, the transmittance increases at 530 nm from the decreased absorption from the short axis of the nanorods. If channel 0 is turned off and channel 1 is switched on, FIG. 9D "1" curve, then the transmittance increases at 740 nm and decreases at 530 nm due to the polarization of the probe light being perpendicular to channel 1.

Figure 10:
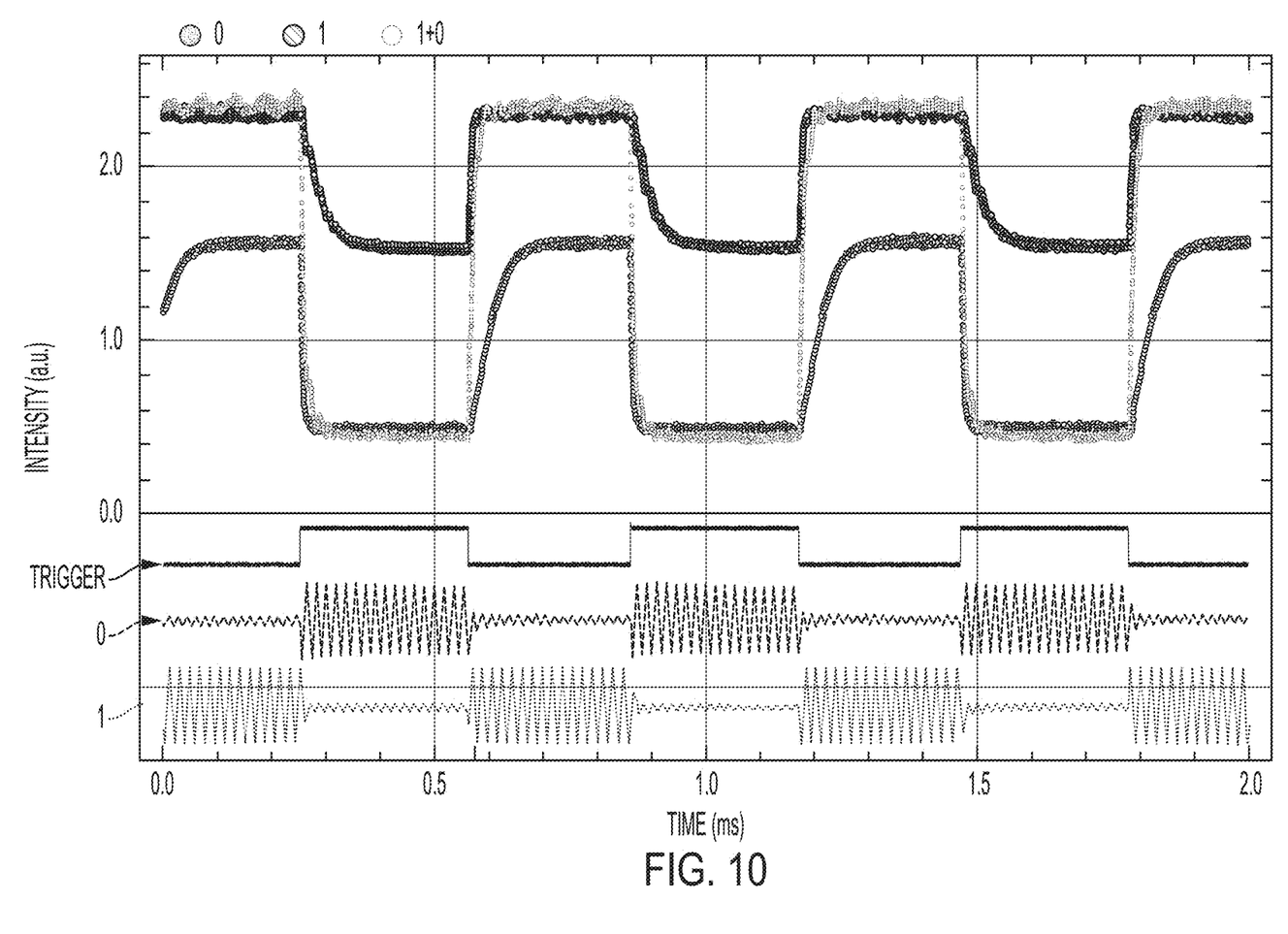
FIG. 10 shows the time-resolved intensity evolution of digital nanorod switching for three applied electric field states: channel 0, channel 1, and both 1+0. The high voltage trigger is shown as well with corresponding driving signals for each channel below, ω=200 kHz, E=14.8 V/μm (channel 0) and 13.5 V/μm (channel 1).

The time-resolved switching of the nanorods is reported in FIG. 10. The white light source was replaced with a diode laser (Thorlabs HL7302MG). The laser light wavelength was 730 nm, corresponding to the absorption peak from the long axis of the nanorods. The light was linearly polarized parallel to the 0 channel. A fast silicon detector (Thorlabs PDA10A) was used to measure the intensity of the light output from the component. Two synchronized high voltage (HV) switches, based on HV power mosfets (IXYS 4500V), were used to toggle the driving signal in each channel (0/1) on and off. The channels were triggered with a 0.6 ms period square wave, FIG. 10, channel 0 when the trigger is high and channel 1 when the trigger is low.

The "0" curve in FIG. 10 shows the response as just channel 0 is switched on and off. With the channel on the nanorods quickly align, leading to a decrease in the transmittance at 730 nm. When channel 0 is switched off, the nanorods begin to randomize due to the thermally mediated rotational diffusion, increasing the transmittance. In contrast, if just channel 1 is switched on, then the transmittance rapidly increases (red curve) and decays to the randomized intensity when channel 1 switches off. The period of the driving signal (5 μs) was set to be faster than the thermal relaxation time of the nanorods; therefore, when the nanorods are exposed to the electric field they do not have time to thermally decay per AC cycle.

Figure 11A:
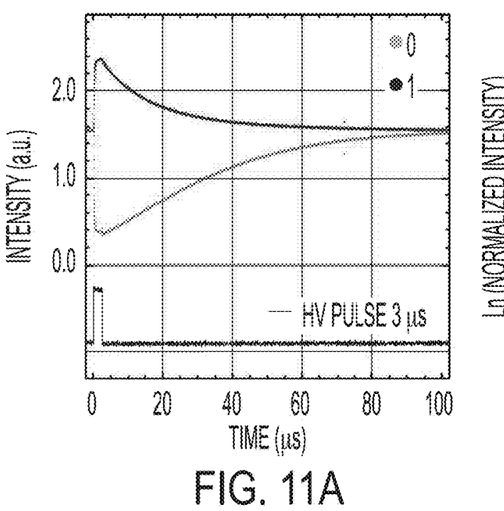
FIG. 11A shows transmitted intensity through the fiber as the nanorods are aligned parallel (0) and perpendicular (1) to the probe light polarization using a 3-μs rectangular pulse, E=32.6 V/μm (channel 0) and 29.7 V/μm (channel 1).
Figure 11B:
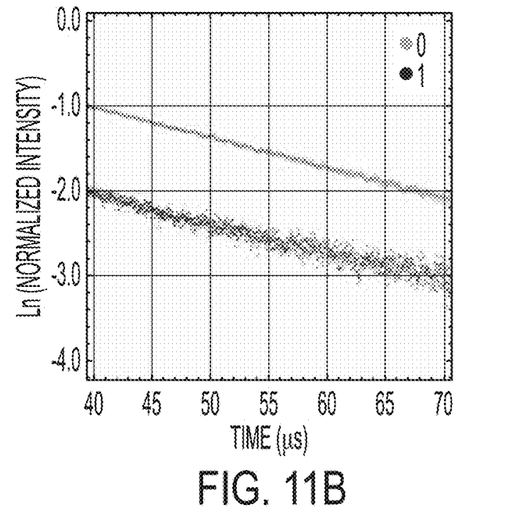
FIG. 11B is a semi-log plot of the normalized intensities in FIG. 11A for intermediary times.

If the driving signal is toggled between channels 0 and 1, then FIG. 10 ("1+0" curve) shows the digital response of the nanorods, switching between the 0 and 1 aligned states, thereby demonstrating the removal of the thermal rotational diffusion constraint from the switching mechanism. By fitting an exponential function to the leading or falling edge of the signals and retrieving the 1/e values, the on- and off-times are defined. The digital on- and off-times in FIG. 10 ("1+0" curve) are both 8 μs, at least three times faster than thermally mediated diffusion, and is limited only by the internal response time of the HV switch and driving frequency. The modulation depth for the digital response is the sum of the individual channels, thereby doubling the contrast ratio for the transmitted signal at 730 nm. The digital switching time is limited by the speed of the electronics in the experiment. The response time was characterized by measuring the time to switch from a random to an aligned state using a single pair of electrodes and a Behlke GHTS 100 push-pull switch for nearly rectangular pulse excitation. The 3-μs-duration rectangular pulse (black curve) with E=32.6 V/μm (channel 0), 29.7 V/μm (channel 1) is applied to the component in FIG. 11A. The nanorods quickly respond to the presence of the electric field, yielding on-times as fast as 110 ns (channel 0) and 160 ns (channel 1). As the pulse shuts off and the electric field is removed, the nanorods then begin to thermally randomize, leading to characteristic off-times of 33 μs (channel 0) and 22 μs (channel 1). The differences for the switching times between both channels may have various contributions; these include small variations in the core and electrode separations, leading to differences in the electric fields for each channel, the creation of a (ionic) surface charge layer on the walls of the central hole during the application of the voltage pulse, and nonlinear response and saturation of the photodetector used. For the off-times all of these effects contribute to a deviation from a single exponential decay of the signals in FIG. 11A. If the off-time signals are analyzed at intermediary times (40-70 μs), then the aforementioned effects are eliminated and both channels follow the same exponential decay with an off-time of 25 μs, FIG. 11B.

Figure 11C:
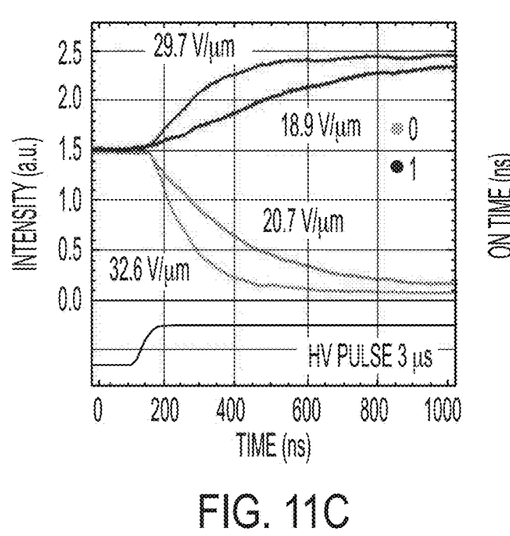
FIG. 11C shows the transmitted intensity for both channels as a function of electric field magnitudes.
Figure 11D:
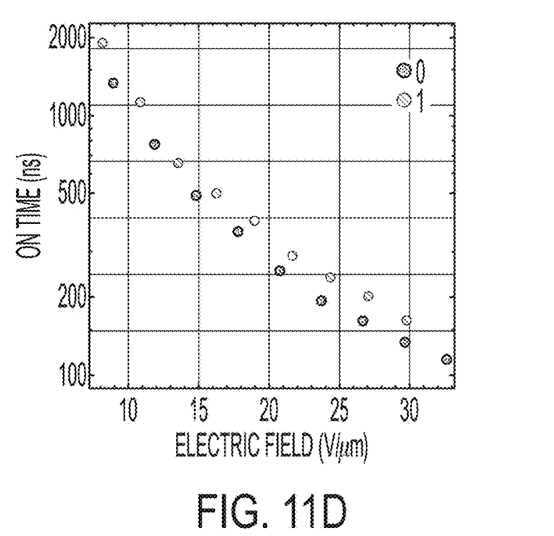
FIG. 11D shows on-time versus electric field magnitude.

FIGS. 11C and 11D are the responses, for both channels, as the electric field magnitude is varied, significantly influencing the on-times. The response is limited only by the electronic circuit, not a physical barrier from the electric field and nanorod coupling. Therefore the on-time could be improved in future experiments using enhanced circuitry. These results indicate that digital switching between 0 and 1 states could be achieved at nanosecond time scales by developing advanced electronics for high voltage (>3 kV) and high frequency (>100 MHz).

In summary, described is an electro-optic fluid fiber that combines light, nanorod suspensions and electric fields into a single component. This component provides the capability to digitally switch the plasmonic nanorods between two orthogonal aligned states using electric fields, demonstrating the removal of the thermal rotation diffusion constraint from the switching mechanism. The nanorods can align into the applied electric field direction in 110 ns, limited only by the experimental electronics. These results may lead to novel opportunities for the point-to-point delivery and modulation of light.

For signaling, it can be possible to arbitrarily modulate the properties of light (amplitude, polarization, and phase), beyond the fiber geometry; for example the switching element, comprised of the nanoparticle suspension and electrodes, can be formed by flat (analogous to a liquid crystal display pixel), curved, conformal or re-configurable surfaces.

An optical switch incorporating this technique might be incorporated into existing networks.

Further Embodiments

Materials used in these techniques can be varied. For example, nanorods of gold and/or silver are possible. In further embodiments, nanorods can be composed of another material (including metallic, semiconducting and/or partially insulating materials). Nanorods may comprise several materials and in aspects of this embodiment, the volume of the nanorod can be compositionally homogeneous or the materials can be structured in a core-shell(s) geometry with, for example, metal, semi-conductor, and/or insulator.

Nanorods can have the shape of a spherocylinder or another shape, isometric or anisometric, for example ellipsoids and asymmetric shapes. In further embodiments, a nanorod can comprise two or more sub-units that are joined together to form the overall shape of a nanorod.

A nanorod can comprise a coating, not necessarily conformal with the underlying nanorod shape. Nanorods can be coated and/or coassembled with other materials (a) intended to shift the position of their plasmon resonance and/or (b) intended to improve their function in aspects including chemical stability, reduced aggregation, and/or environmental compatibility. A coating can be optically, electrically or mechanically active, conducting, semi-conducting or insulating.

These techniques can be used with one or more populations of nanorods, each population having different attributes such as material, shape, size, and/or coatings.

Various liquids can be used singly or in combination to dissolve and/or suspend nanorods. In one embodiment, the liquid is toluene. Other liquids can be used including inorganic, organic, or aqueous liquids. In further embodiments, a gas or vacuum acts to disperse the nanorods as an aerosol. In still another embodiment, the nanorods are dispersed in a solid or gel. The solvent can be selected to have a certain refractive index in order to tailor the spectral location of the surface plasmon resonance. The solvent could include one or more additives intended to enhance the stability of the nanorod suspension and/or to modify its optical properties such as color and/or transmittance at certain wavelengths and/or bands of wavelengths. In yet further embodiments, the solvent is absent and the nanorods form a liquid crystal and/or other phase of matter.

Illumination of an optical modulator can be provided in a number of ways. The spectral characteristics of the illumination can vary considerably. In one embodiment, the light source can be a broadband, white-light source that emits over a wide wavelength range, including portions of and/or the entirety of the ultraviolet, visible, and/or infrared (near-infrared, mid-wave infrared, long-wave infrared) spectral bands. However, it is also possible to use a light source emitting in a narrow band centered around a single wavelength. The light source can consist of several sources that emit at different wavelengths or bands of wavelengths. The spectral output of the light source could be modified by passage through one or more optical filters. In various aspects, the light source is the sun and/or ambient lighting.

The geometry of the illumination may be configured as desired. In one embodiment, a device is illuminated from the back side opposite the side of intended viewing (i.e. backlit). In another, the device is illuminated from the side, with the light distributed across the back of the device. It is also possible for the device to be illuminated from the front and to contain a reflective back-plane. In a further embodiment, the device is illuminated such that the illumination is not observed by the user, and primarily scattering from the nanorods is observed (i.e. the device operates in a darkfield scattering configuration). One or more light sources might be used, possibly including individual light sources for each pixel of the device. The light source could operate continually or vary in intensity over time, including periodic variations and/or variations representing a data signal. The light source may have any polarization state, including linear, circular, and elliptical, and the polarization state may vary over time, potentially representing a signal.

A device can be configured for observation from the front, back, and/or any oblique angle.

An optical modulator incorporates one or more pixels, each incorporating one or more nanorods. Multiple pixels can be stacked in a layered structure such that a single ray of light passes through more than one pixel. Multiple pixels can be arrayed in a planar manner, in one or more different configurations include periodic, aperiodic, and quasiperiodic arrays. Pixels may have the same size or a variety of sizes within the same device. Each pixel may comprise several sub-pixels, each of which is designed to interact with a different portion of the electromagnetic spectrum. The sub-pixels may constitute an additive and/or subtractive color mixing scheme such as red/green/blue (RGB) and/or cyan/magenta/yellow/black (CMYK). Each pixel can comprise one or more than one pair of electrodes (such as orthogonal pairs of electrodes) and/or other schemes for generating electric field beyond the use of parallel electrode pairs. The pixels can be integrated into one or more optical fibers. A pixel shape can be a rectangle and/or any other shape. For example, the pixel is shaped so as to constitute an entire image, character(s) of text, or other representation(s). The pixel can be shaped so that by combination with other pixels, an image, character(s) of text, or other representation(s) are perceived. The pixels can be arranged in 3-dimensional arrays so as to constitute "volume elements" or "voxels" of a volumetric display.

An optical modulator can operate using various contrast mechanisms. The device may utilize spatial, and/or temporal contrast in luminance, chromaticity, and/or polarization of pixels. The device may operate with pixels in an intermediate state of alignment (i.e. between isotropic and fully aligned states).

An optical modulator optionally includes a support substrate for the one or more pixels. It may be rigid or flexible, planar, curved, and/or otherwise textured. The substrate is optically configured to be conformal with another underlying object. The substrate can be reconfigurable, an optical fiber, a fabric, a biological tissue, or a combination of these.

Nanorods in an optical modulator can be aligned using electric fields or other types of fields, including electric, magnetic, optical, pressure, temperature, concentration, and/or mechanical stress/strain, or a combination thereof.

An optical modulator might be driven in various ways. In one embodiment, it is driven by alternating current (AC). The frequency of the AC driving voltage may be 60 Hz, 5 kHz and/or any other frequency. The AC driving voltage may be modulated with other waveforms, including those encoding data. The magnitude of the AC driving voltage may be any value appropriate for achieving a desired degree of nanorod alignment. The driving source may employ any manner of frequency- and/or amplitude-modulation (FM/AM) scheme.

A pixel in an optical modulator may be controlled independently or as part of an integrated control system for multiple pixels.

An optical modulator may be implemented in combination with other technologies that also modulate properties of light, including liquid-crystal-based light modulators and/or displays. In other embodiments, the modulator has a modulatory effect on light solely via action of nanorods.

A device may be used to transmit, receive, or otherwise modulate data streams encoded in the light that interacts with the pixels such as for visible light communication (VLC). These data streams may be encoded in one or more keying systems [see ref. 6], including color intensity modulation (CIM), color-shift keying (CSK), and metameric modulation (MM).

In one prophetic example, a signal can be embedded in visible light (such as visible light serving as illumination or visible light that serves as a display of a still or moving image) by modulating a property of the light (for example, brightness, hue, etc.) with an optical modulation rate higher than perceived by humans, for example faster than 60 Hz, faster than 120 Hz, faster than 500 Hz, and so forth. The signal could be interpreted by an apparatus configured to detect the modulated light and spaced some distance apart from the source thereof.

By controlling the alignment of the nanorods, a device can modulate the real and imaginary optical phase shifts through the optical element; thereby controlling the absorption, scattering, refraction, reflection, transmission, optical phase, polarization (including linear, circular, and elliptical), direction of propagation, spectral composition, and/or combinations thereof.

Individual pixels and/or the device may be encapsulated and/or otherwise packaged so as to impart improved attributes such as durability, longevity, user safety, regulatory compliance, and/or end-of-life management.

Switching elements can be simply spliced into current optical fiber networks and used to remotely sense and signal (via electric fields). For example they can used as an ultrafast (GHz) telecommunications switch or to sense large electric fields (such as for high voltage transformers).

CONCLUDING REMARKS

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

REFERENCES

[1] A. Kristensen, J. K. W Yang, S. I. Bozhevolnyi, S. Link, P. Nordlander, N. J. Halas, and N. A. Mortensen, "Plasmonic colour generation," Nat. Rev. Mater. 2, (2016).

[2] J. Fontana, G. K. B. Da Costa, J. M. Pereira, J. Naciri, B. R. Ratna, P. Palffy-Muhoray, and I. C. S. Carvalho, "Electric field induced orientational order of gold nanorods in dilute organic suspensions," Appl. Phys. Lett. 108, 1-5 (2016).

[3] A. Smith and J. Guild, "The C.I.E. Colourimetric Standards and their Use," Trans. Opt. Soc. 33, 73-134 (1931).

[4] S. Etcheverry, L. F. Araujo, G. K. B. da Costa, J. M. B. Pereira, A. R. Camara, J. Naciri, B. R. Ratna, I. Hernandez-Romano, C. J. S. de Matos, I. C. S. Carvalho, W. Margulis, and J. Fontana, "Microsecond switching of plasmonic nanorods in an all-fiber optofluidic component," Optica 4, 864 (2017).

[5] S. Etcheverry, L. F. Araujo, I. C. S. Carvalho, W. Margulis, and J. Fontana, "Digital electric field induced switching of plasmonic nanorods using an electro-optic fluid fiber," Appl. Phys. Lett. 111, 221108 (2017).

[6] E. Monteiro and S. Hranilovic, "Design and Implementation of Color-Shift Keying for Visible Light Communications," J. Light. Technol., 32, 2053-2060 (2014).

What is claimed is:

1. An electro-optical fluid fiber component comprising:
   a fiber component comprising an inlet and an outlet configured to receive and send light, respectively, through the fiber component;
   a plurality of nanorods suspended in a fluid contained between the inlet and outlet of the fiber component; and
   electrodes configured to apply an electric field to the nanorods sufficient to repeatably alter orientation of the nanorods and thereby modulate passage of the light through the fiber component in a manner corresponding to the nanorod orientation.

2. The electro-optical fluid fiber component of claim 1, further comprising connections to a further network of optical fibers.

3. A method of modulating light, comprising:
   transmitting light through an electro-optical fluid fiber component comprising a plurality of nanorods suspended in a fluid contained in the fiber component and electrodes configured to apply an electric field to the nanorods sufficient to repeatably alter their orientation, wherein the light passes through the plurality of nanorods;
   passing an electric field across the electrodes, thereby modulating the light as it passes through the nanorods, wherein the modulation corresponds to the nanorod orientation.

4. An optical modulator comprising:
   at least one pixel comprising a plurality of nanorods suspended in a fluid and configured to receive illumination from an illumination source; and
   electrodes configured to apply an electric field to the nanorods sufficient to repeatably alter their orientation in suspension, such that the alteration of nanorod orientation is effective to modulate at least one optical property of the nanorods suspended in the fluid.

5. The optical modulator of claim 4, wherein the pixel is a planar structure.

6. The optical modulator of claim 4, further comprising a substrate supporting the at least one pixel.

7. The optical modulator of claim 4, wherein the modulation is accomplished solely via alternation of the orientation of the nanorods.

8. The optical modulator of claim 4, wherein the modulator is part of a light communications network.

9. The optical modulator of claim 4, wherein the nanorods are suspended in a liquid and contained on a substrate.

10. The optical modulator of claim 9, wherein the liquid is toluene.

11. The component of claim 1, wherein the component is operable at switching speeds of one millisecond or less.

12. The component of claim 1, wherein said plurality of nanorods are suspended as an aerosol.

13. The optical modulator of claim 4, wherein said plurality of nanorods are suspended as an aerosol.

14. The optical modulator of claim 4, wherein a state of nanorod alignment is controllable by varying the magnitude and/or frequency of the electric field.

* * * * *